(12) United States Patent
Suzuki

(10) Patent No.: US 8,219,866 B2
(45) Date of Patent: Jul. 10, 2012

(54) APPARATUS AND METHOD FOR CALCULATING AND STORING CHECKSUMS BASED ON COMMUNICATION PROTOCOL

(75) Inventor: Motoharu Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 11/866,320

(22) Filed: Oct. 2, 2007

(65) Prior Publication Data

US 2008/0104162 A1 May 1, 2008

(30) Foreign Application Priority Data

Oct. 26, 2006 (JP) ................................ 2006-291420

(51) Int. Cl.
*G08C 25/02* (2006.01)
(52) U.S. Cl. ........ 714/748; 714/758; 709/203; 709/212; 709/213; 709/234; 709/235; 709/236; 370/229
(58) Field of Classification Search .................. 709/203, 709/212, 213, 234–236; 370/229; 714/748, 714/758
See application file for complete search history.

(56) References Cited

U.S. PATENT DOCUMENTS

| | | | | |
|---|---|---|---|---|
| 5,430,842 A * | 7/1995 | Thompson et al. | ........... | 709/236 |
| 5,663,952 A * | 9/1997 | Gentry, Jr. | ..................... | 370/252 |
| 5,826,032 A * | 10/1998 | Finn et al. | ..................... | 709/236 |
| 6,266,337 B1 * | 7/2001 | Marco | ........................... | 370/410 |
| 6,289,023 B1 * | 9/2001 | Dowling et al. | .............. | 370/419 |
| 6,324,670 B1 * | 11/2001 | Henriksen | ..................... | 714/807 |
| 6,345,302 B1 * | 2/2002 | Bennett et al. | ................ | 709/236 |
| 6,412,092 B1 * | 6/2002 | Raghunath | ..................... | 714/807 |
| 7,020,079 B2 * | 3/2006 | Chu | ............................. | 370/225 |
| 7,142,540 B2 * | 11/2006 | Hendel et al. | ................. | 370/392 |
| 7,181,675 B2 * | 2/2007 | Mantog | ......................... | 714/776 |
| 7,386,627 B1 * | 6/2008 | Lango et al. | .................. | 709/236 |
| 7,428,690 B2 * | 9/2008 | Arita et al. | .................... | 714/766 |
| 7,447,810 B2 * | 11/2008 | Edirisooriya | .................. | 710/22 |
| 7,502,925 B2 * | 3/2009 | Maufer et al. | ................ | 713/161 |
| 7,785,905 B2 * | 8/2010 | Benslimane et al. | ........... | 438/14 |
| 2004/0218623 A1 * | 11/2004 | Goldenberg et al. | ......... | 370/463 |
| 2007/0011560 A1 * | 1/2007 | Backman et al. | ............. | 714/758 |
| 2007/0044002 A1 * | 2/2007 | Johnson et al. | ............... | 714/758 |

FOREIGN PATENT DOCUMENTS

| | | |
|---|---|---|
| JP | 04-352054 A | 12/1992 |
| JP | 06-078024 A | 3/1994 |
| JP | 06-78024 A | 3/1994 |
| JP | 2005-354270 A | 12/2005 |
| JP | 2006-081033 A | 3/2006 |

OTHER PUBLICATIONS

Transmission Control Protocol, obtained from the Internet at: http://en.wikipedia.org/wiki/Transmission_Control_Protocol#Reliable_transmission, on Sep. 27, 2011.*

* cited by examiner

*Primary Examiner* — Kamal B Divecha

(74) *Attorney, Agent, or Firm* — Canon U.S.A., Inc. IP Division

(57) ABSTRACT

An apparatus determines a communication protocol for transmitting data, adds a calculation result of checksum calculation to the data and transmits the result with the data, and stores the calculation result in a memory according to a communication protocol determination.

5 Claims, 8 Drawing Sheets

FIG.2A

IP HEADER

| VERSION (701) | HEADER LENGTH (702) | SERVICE TYPE (703) | PACKET LENGTH (704) | |
|---|---|---|---|---|
| IDENTIFIER (705) | | | FLAG (706) | FRAGMENT OFFSET (707) |
| Time to Live (708) | PROTOCOL NUMBER (709) | | HEADER CHECKSUM (710) | |
| SOURCE IP ADDRESS (32 bits) (711) | | | | |
| DESTINATION IP ADDRESS (32 bits) (712) | | | | |
| OPTION TYPE (713) | OPTION (714) | | | |
| | PAD (8/16/24 bits) (715) | | | |

FIG.2B

TCP HEADER

| SOURCE PORT NUMBER (716) | | DESTINATION PORT NUMBER (717) | |
|---|---|---|---|
| SEQUENCE NUMBER (718) | | | |
| ACKNOWLEDGMENT NUMBER (719) | | | |
| HEADER LENGTH (720) | (reserved) | CODE BIT (721) | WINDOW SIZE (722) |
| CHECKSUM (723) | | EMERGENCY POINTER (724) | |
| OPTION (725) | | | |
| | PAD (8/16/24 bits) (726) | | |

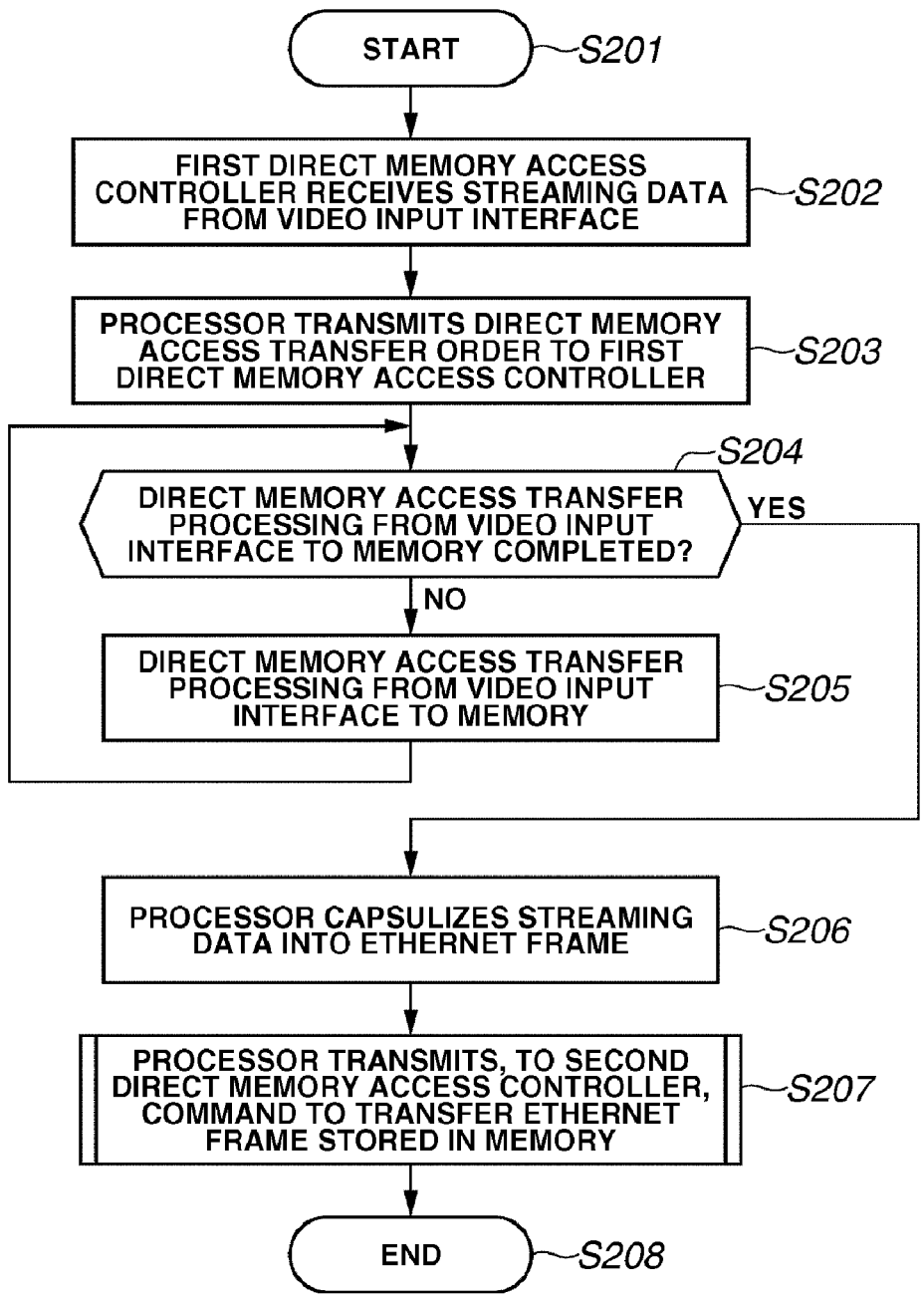

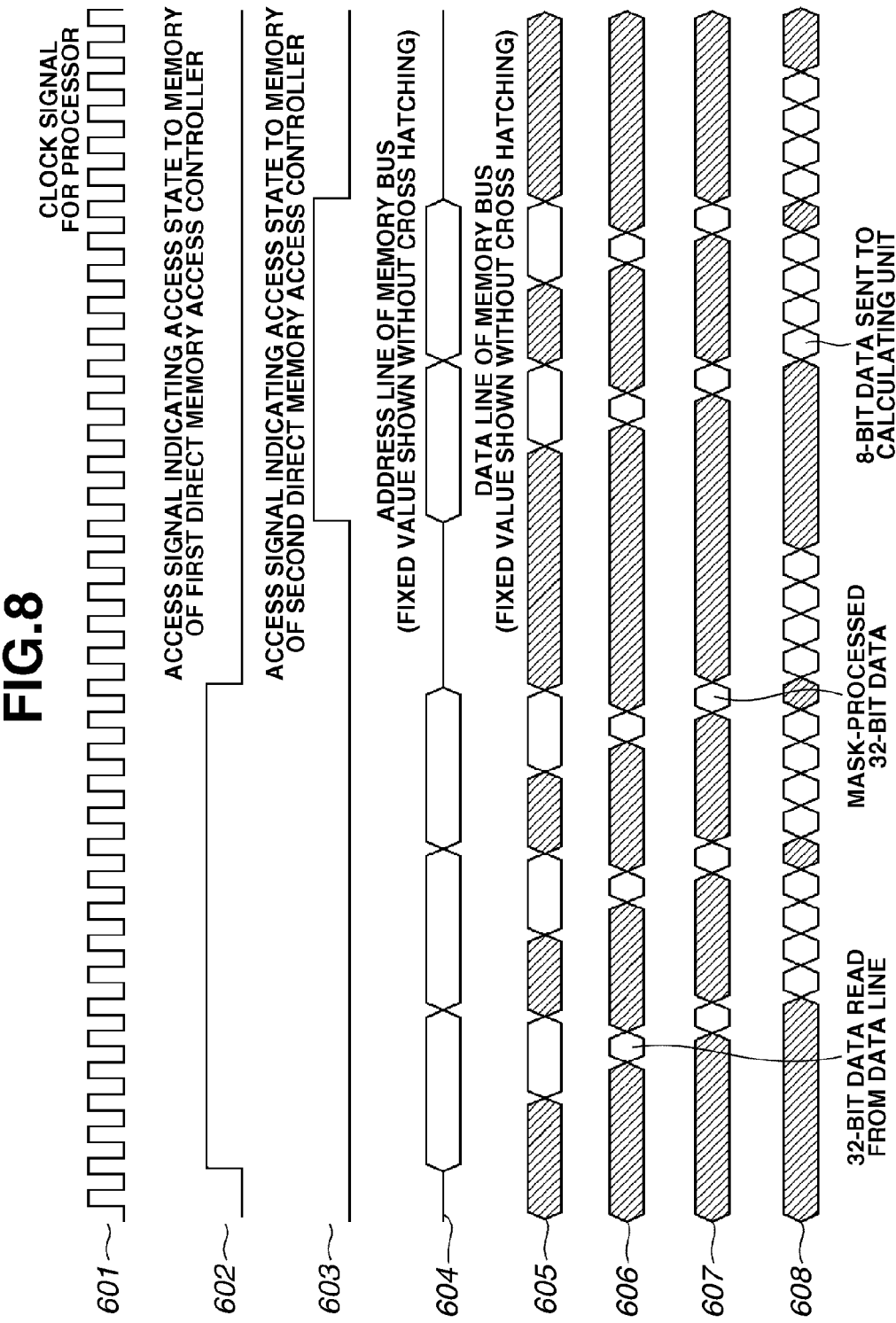

APPARATUS AND METHOD FOR CALCULATING AND STORING CHECKSUMS BASED ON COMMUNICATION PROTOCOL

BACKGROUND OF THE INVENTION

1. Field of the Invention

The present invention relates to a method for processing data to be transmitted and handling checksum calculation results associated with the data and a corresponding apparatus (e.g., communication apparatus).

2. Description of the Related Art

One disadvantage associated with a conventional data processing apparatus (e.g., communication apparatus) is that, during data communication, a processor of the apparatus may be so heavily loaded in performing checksum calculation, the throughput of the apparatus is degraded. As a solution therefor, the hardware is provided to perform checksum calculation in direct memory access (DMA) transfer so as to insert a checksum in a communication frame.

For example, Japanese Patent Application Laid-Open No. 4-352054 discusses a conventional technique for performing checksum calculation using the hardware. According to the conventional technique of Japanese Patent Application Laid-Open No. 4-352054, checksum calculation is performed by the hardware, and a CPU reads and handles its checksum calculation result.

Japanese Patent Application Laid-Open No. 6-78024 (U.S. Pat. No. 5,430,842) discusses a conventional technique for automatically inserting a checksum calculation result into a communication frame by using the hardware. According to a communication interface system of Japanese Patent Application Laid-Open No. 6-78024, after a processor transmits a transfer command of network packet data to a direct memory access unit, the network packet into which a checksum is automatically inserted is sent to a network. The processor adds in advance control information necessary for checksum calculation to the network packet in the form of a checksum header, and transmits the network packet having the checksum header added thereto to a communication interface. Then, the central processing unit (CPU) decodes the checksum header in the communication interface to perform the checksum calculation.

However, according to the conventional technique discussed in Japanese Patent Application Laid-Open No. 4-352054, the CPU has to wait for the complete checksum calculation before issuing a command to output the network packet which is presently handled, thus causing degradation of throughput.

The checksum calculation result is stored in a predetermined position of the communication packet according to the communication protocol. When the conventional technique of Japanese Patent Application Laid-Open No. 4-352054 in which the CPU handles the checksum calculation result, is applied to a system having multiple communication protocols, the processing contents that are processed by the CPU may possibly differ every time the communication frame is sent, which degrades throughput.

According to the conventional technique of Japanese Patent Application Laid-Open No. 6-78024, the processor is always required to recognize the communication protocol of the communication frame in order to implement a series of processes for calculating the checksum and inserting the checksum into the network packet. In addition, it is necessary to notify the hardware of an address where the checksum calculation is inserted in the communication frame. Further, the publication gives no indication about re-transmission procedures, when the communication protocol includes re-transmission.

Therefore, in the system having multiple communication protocols, the processor is always required to change a checksum header which is given to the communication interface (i.e. a processor command) so that a number of processes that the processor performs, increases.

It is assumed herein that the processor configures the network packet in the main storage unit. Thus, the checksum calculation cannot be performed when the communication protocol presently handled by the processor is not identified by a bridge circuit, etc.

In the communication protocol that requires re-transmission of the communication frame, if the same processes as that for the transmission at the first time are to be performed for re-transmission, the checksum calculation needs to be performed again, which causes degradation of throughput.

SUMMARY OF THE INVENTION

An embodiment of the present invention is directed to realizing rapid throughput in data transfer.

According to an aspect of the present invention, an embodiment is directed to an apparatus which is capable of transmitting data stored in a memory. The apparatus includes a determination unit configured to determine a communication protocol for transmitting the data, a calculation unit configured to perform checksum calculation for the data to generate a calculation result, and a processing unit configured to add the calculation result to the data, transmit the data with the calculation result, and store the calculation result in the memory, according to determination made by the determination unit.

According to another aspect of the present invention, an embodiment is directed to a method for transmitting data stored in a memory. The method includes determining a communication protocol for transmitting the data, performing checksum calculation for the data to generate a calculation result, transmitting the calculation result with the data, and storing the calculation result in the memory according to the determined communication protocol.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A is a diagram illustrating a configuration of an Internet Protocol (IP) header.

FIG. 2B is a diagram illustrating a configuration of a Transmission Control Protocol (TCP) header.

FIG. 3 is a flowchart illustrating a data transfer process of the communication apparatus of FIG. 1.

FIG. 8 is a diagram illustrating an example of a timing chart at the time of acquiring target data for checksum calculation by the checksum calculator.

DETAILED DESCRIPTION OF THE EMBODIMENTS

Figure 1:
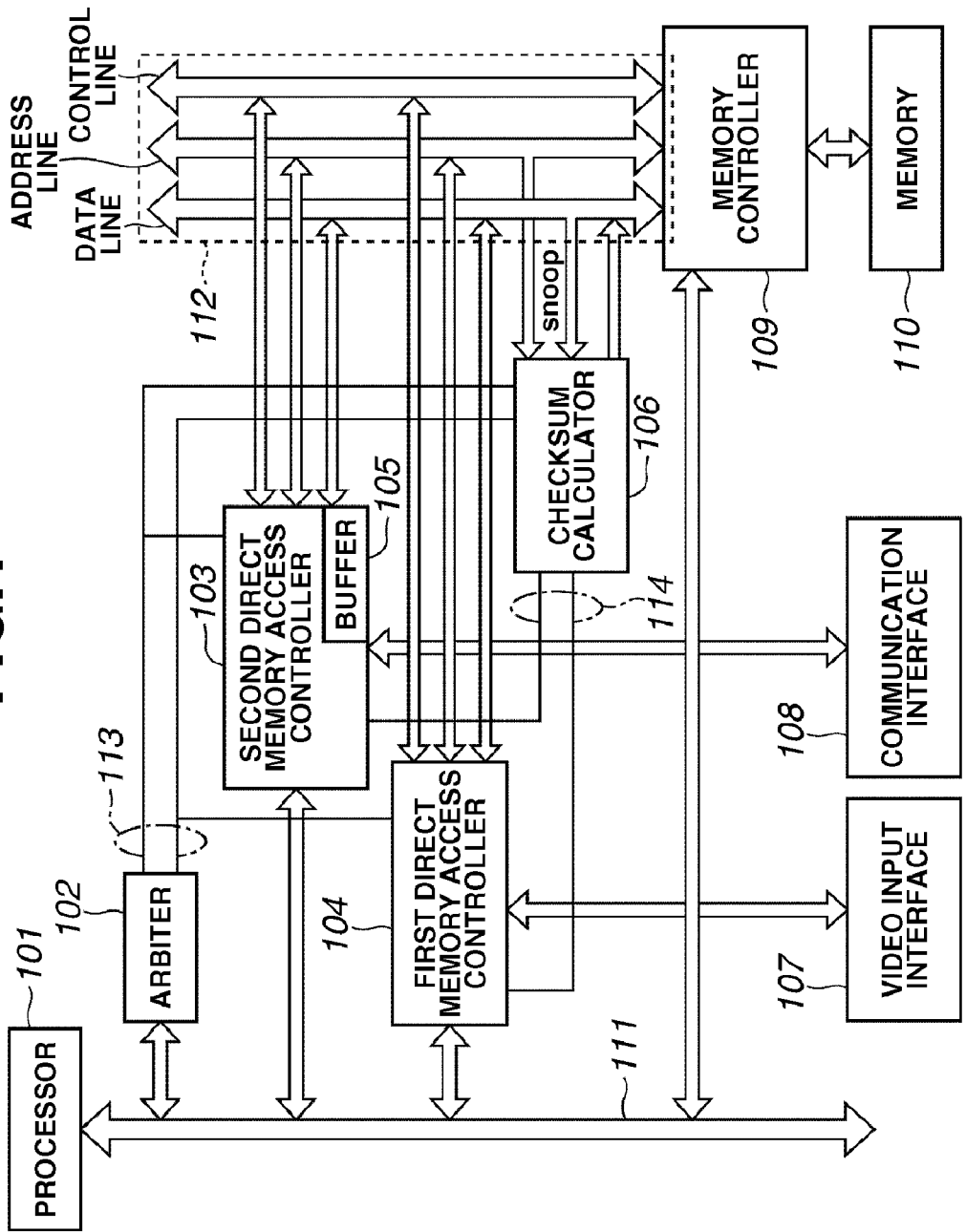
FIG. 1 is a block diagram illustrating a configuration of a communication apparatus according to an embodiment of the present invention.

FIG. 1 is a block diagram illustrating an exemplary configuration of a data processing apparatus according to an exemplary embodiment of the present invention. In an embodiment, the data processing apparatus is a communication apparatus which processes input streaming data in the unit of Ethernet® frame, and transmits the data to a network. The data processing apparatus of FIG. 1 is described below as a communication apparatus. The data processing apparatus of FIG. 1 can also be a subsystem (e.g., partial circuit) included in the communication apparatus.

In FIG. 1, a processor 101 (CPU) controls the communication apparatus. The processor 101 (CPU) is connected to an arbiter 102, a first direct memory access controller 104, a second direct memory access controller 103 and a memory controller 109 via a processor bus 111.

The arbiter 102 is connected to the processor bus 111, the first direct memory access controller 104, the second memory access controller 103, and the checksum calculator 106. The arbiter 102 arbitrates the access right when the first direct memory access controller 104 and the second memory access controller 103 intend to access a memory 110.

The first direct memory access controller 104 is connected to the processor bus 111, a memory bus 112, the checksum calculator 106 and a video input interface 107. The first direct memory access controller (DMAC) 104 directly communicates data between the video input interface 107 and the memory 110.

The second direct memory access controller 103 is connected to the processor bus 111, the memory bus 112, the checksum calculator 106 and a communication interface 108. The second direct memory access controller (DMAC) 103 directly communicates data between the communication interface 108 and the memory 110. The second direct memory access controller 103 includes a buffer 105. The second direct memory access controller 103 can access the buffer 105 without competition from another unit.

The checksum calculator 106 is connected to the memory bus 112, and snoops the memory bus 112 to perform checksum calculation. The video input interface 107 receives streaming data. The communication interface 108 has a function for automatic generating/checking a Frame Check Sequence (FCS) of the Ethernet® frame. The communication interface 108 outputs data transferred from the memory 110 to the network under control of the second direct memory access controller 103.

The memory controller 109 controls read/write access from the functional blocks to the memory 110. The memory 110 is a random access memory (RAM) which stores the input streaming data or generated communication frame.

An arbitration signal line 113 is used for transmitting/receiving a memory access right arbiter signal which is produced when the first direct memory access controller 104 and the second direct memory access controller 103 access the memory 110.

A control line 114 is used when the first direct memory access controller 104 and the second direct memory access controller 103 send a command to the checksum calculator 106.

In the communication apparatus of FIG. 1, the arbiter 102 for memory access controls the competition among the plurality of direct memory access controllers 103 and 104 even when the controllers 103 and 104 simultaneously operate. Hence, only one checksum calculator 106 is required. In this case, it is simply required to input memory access right arbiter signals that have been input to the direct memory access controllers 103 and 104, to the checksum calculator 106 in order to identify the direct memory access controller which accesses the memory 110.

FIG. 2A and FIG. 2B illustrate frame formats of the Ethernet® frame, when the communication protocol is a Transmission Control Protocol/Internet Protocol (TCP/IP). FIG. 2A is a diagram illustrating a configuration of an IP header. FIG. 2B is a diagram illustrating a configuration of a TCP header.

In FIG. 2A, the illustrated IP header includes a version field 701 for containing data representing the version of the IP, a header length field 702 for containing data representing length information of the IP header and a service type field 703 for containing data representing the priority order of each data item. In addition, the illustrated IP header includes a packet length field 704 for containing data which represents the entire length of the IP packet including the IP header, an identifier field 705 for containing data regarding a data division and a data assembly, and a flag field 706 for containing data which represents the last data at the time of data division. The IP header includes also a fragment offset field 707 for containing data which represents position information about divided data in original data, a "Time to live" field 708 for containing data which represents the time to live (TTL) of a packet, and a protocol number field 709 for containing data which represents protocol identification information of the transport layer. Further, the IP header includes a header checksum field 710 which is an error detecting code for the IP header, a source IP address field 711, a destination IP address field 712, and an option field 714 for containing option information.

The option field 714 includes an option type field 713 which is an identifier when an option is used, and a PAD field 715 which is data for adjusting the IP header length when an IP option is used.

In FIG. 2B, the illustrated TCP header includes a source port number field 716, a destination port number field 717, and a sequence number field 718 for containing information necessary for arranging a sequence of transmission data. In addition, the TCP header includes an acknowledgment number field 719 for containing data which represents a byte position where data has been received, a header length field 720 for containing data which represents the size of the TCP header, and a code bit field 721 for containing data which represents various flag information when the TCP is used. The TCP header also includes a checksum field 723, an emergency pointer field 724 and a window size field 722 which is information notifying the window size of the receiver side. The checksum field 723 is an error detecting code of a pseudo header, a TCP header and a TCP payload. The emergency pointer field 724 represents urgency data. The TCP header includes also an option field 725 for containing various setting information in the TCP. The option field 725 includes PAD field 726 for containing data for adjusting the TCP header length when the TCP option is used.

FIG. 3 is a flowchart illustrating a series of processes implemented by the communication apparatus of FIG. 1. The processes includes procedures for receiving data from the video input interface 107, processing the received data in the unit of Ethernet (trademark) frame, and transferring the data to the communication interface 108.

In step S201, the communication apparatus starts the processes. The communication apparatus receives no data from the video input interface 107 at this stage.

In step S202, the first direct memory access controller 104 receives streaming data (hereinafter, referred to as data) from the video input interface 107.

In step S203, the processor 101 transmits an execution command to the first direct memory access controller 104. According to this execution command sent by the processor 101 to the first direction memory access controller 104, data input by the video input interface 107 is DMA-transferred to the memory 110.

In step S204, the processor 101 determines whether the DMA transfer process for transferring data from the video input interface 107 to the memory 110 has been completed. If it is determined in step S204 that the DMA transfer process has not been completed (NO in step S204), the flow proceeds to step S205. On the contrary, when it is determined in step S204 that the DMA transfer process has been completed (YES in step S204), the flow proceeds to step S206.

In step S205, the first direct memory access controller 104 executes a process for DMA transferring the data input from the video input interface 107 to the memory 110.

In step S206, the processor 101 executes a process for capsulizing the streaming data stored in the memory 110 in the Ethernet® frame. In this case, the processor 101 does not execute header checksum calculation for the network layer and checksum calculation for the transport layer.

In step S207, the processor 101 executes a process for transmitting a command to transfer the Ethernet®frame stored in the memory 110 to the second direct memory access controller 103. The second direct memory access controller 103 having received the transfer command from the processor 101 executes a process for transferring the Ethernet® frame on the memory 110 to the communication interface 108, adding a checksum as needed.

In step S208, the communication apparatus ends the series of the processes.

Figure 4:
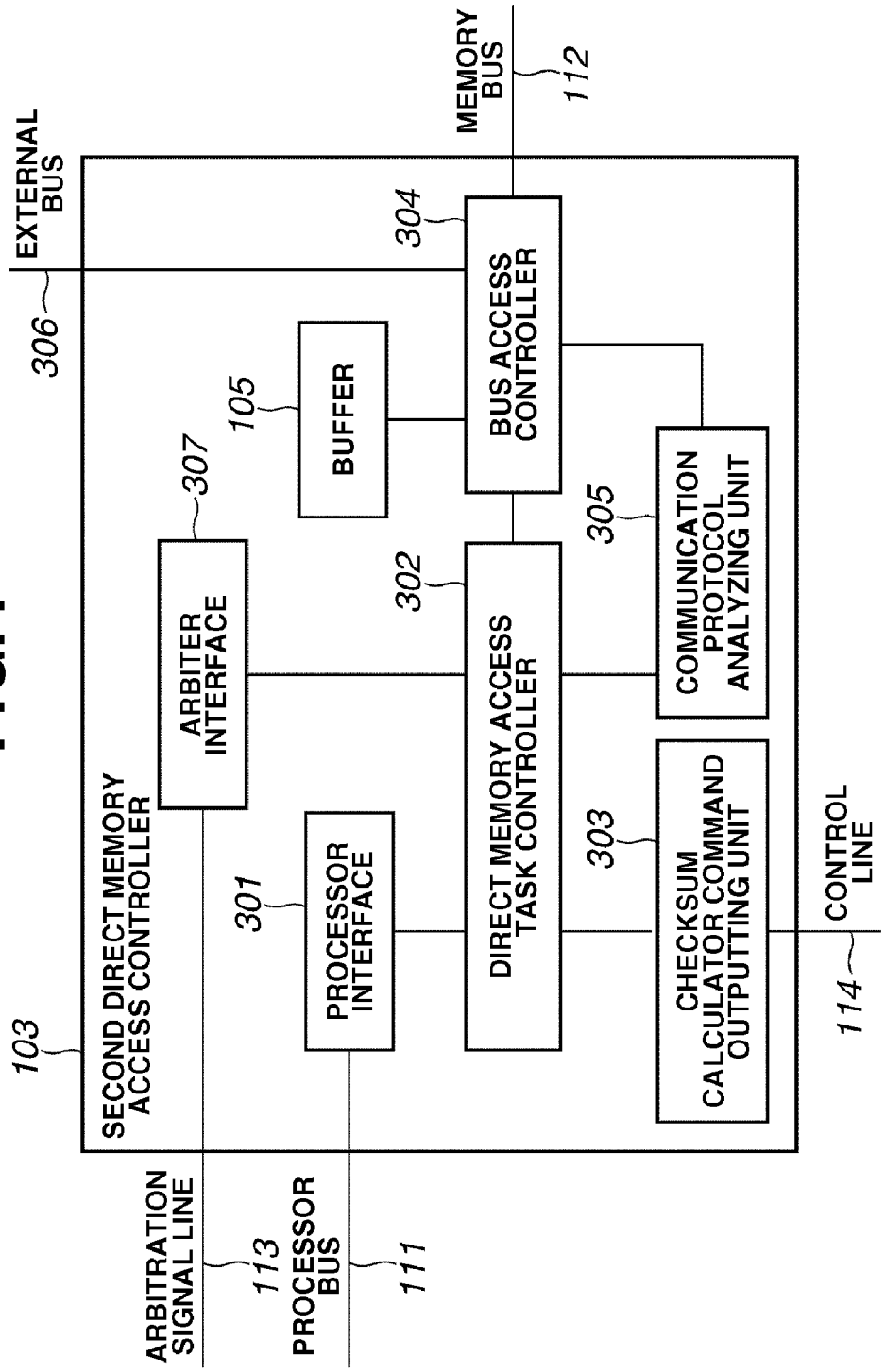
FIG. 4 is a block diagram illustrating a configuration of a second direct memory access controller.

FIG. 4 is a block diagram illustrating a configuration of the second direction memory access controller 103 in the communication apparatus of FIG. 1.

In FIG. 4, a processor interface 301 handles various information to/from the processor 101 via the processor bus 111. The processor interface 301 also decodes a command which is sent from the processor 101 to the second direct memory access controller 103.

A direct memory access task controller 302 executes a command from the processor interface 301, and manages the task in the second direct memory access controller 103. A checksum calculator command outputting unit 303 outputs a command to the checksum calculator 106 via the control line 114. A bus access controller 304 controls data transfer performed among the memory bus 112, an external bus 306 and the buffer 105.

A communication protocol analyzing unit 305 analyzes the network layer of the Ethernet® frame that is read by a bus access controller 304 from the memory 110 via the memory bus 112, and identifies its communication protocol. The external bus 306 is connected to the communication interface 108.

An arbiter interface 307 is connected to the arbiter 102 via the arbitration signal line 113 and handles a memory access right arbiter signal to/from the arbiter 102.

It is useful that the buffer 105 can be freely accessed by the second direct memory access controller 103 without competing with a CPU, any other devices or circuits. For that purpose, the buffer 105 can be installed either inside or outside the second direct memory access controller 103.

Figure 5:
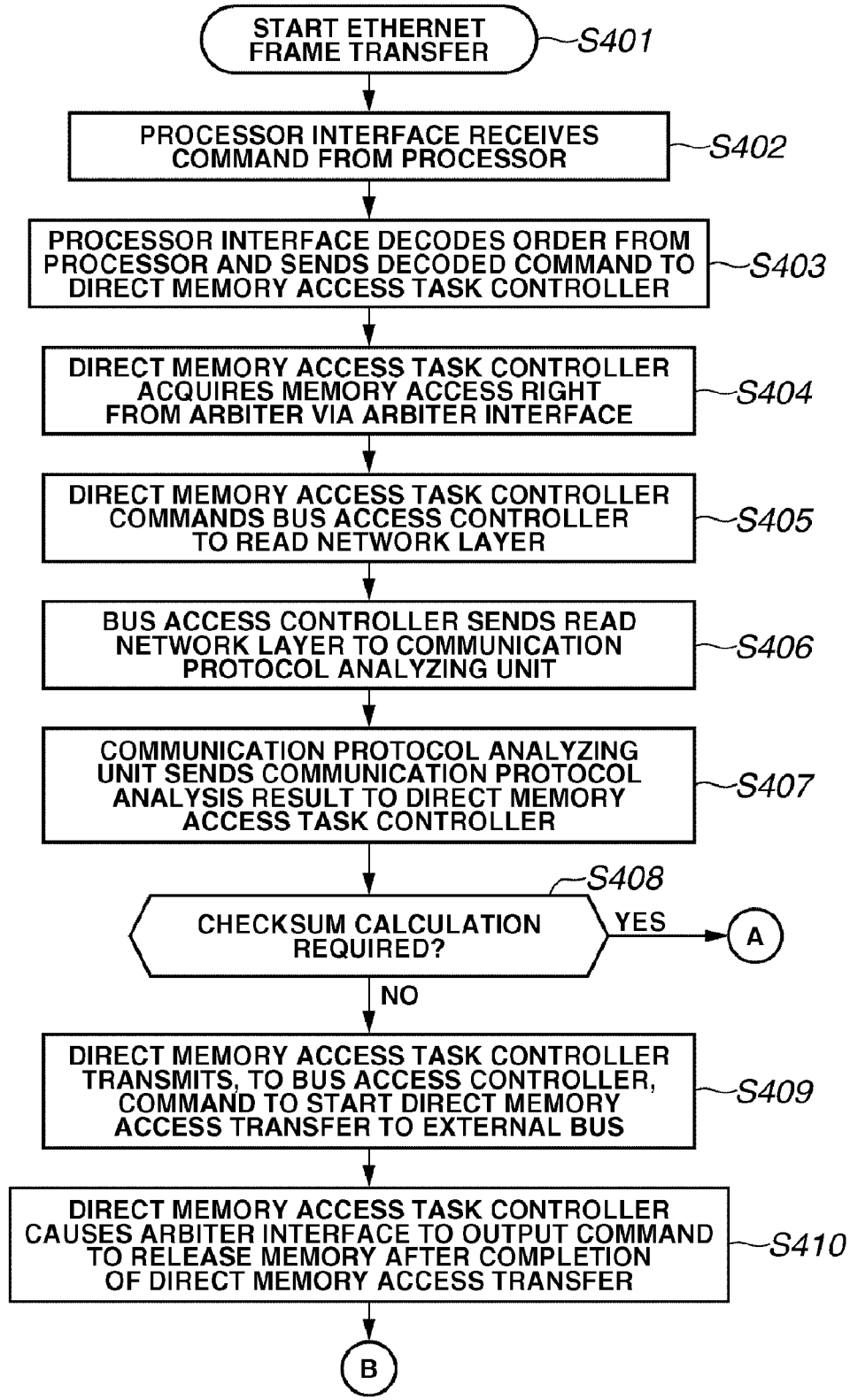
FIG. 5 is a flowchart illustrating an operational process at the time of transferring an Ethernet® frame in step S207 of FIG. 3.
Figure 6:
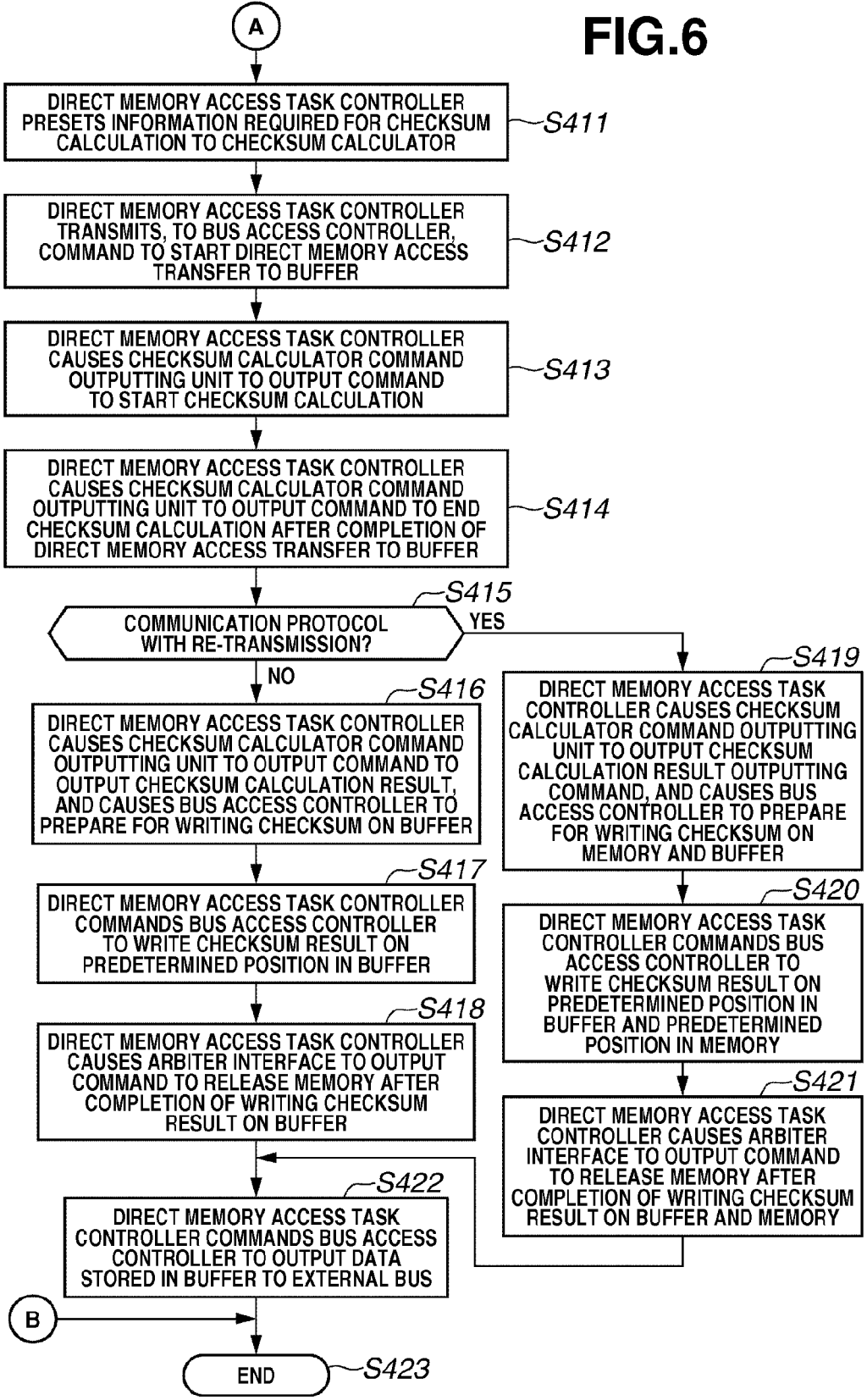
FIG. 6 is a flowchart showing an operational process at the time of transferring an Ethernet® frame in step S207 of FIG. 3.

FIGS. 5 and 6 are flowcharts illustrating operational processes when the second direct memory access controller 103 transfers the Ethernet® frame stored in the memory 110 to the communication interface 108 in step S207 of FIG. 3.

In step S401, the communication apparatus starts the Ethernet® frame transfer. The second direct memory access controller 103 receives no command from the processor 101 at this stage.

In step S402, the processor interface 301 receives a transfer command from the processor 101 via the processor bus 111. The transfer command received from the processor 101 includes information regarding the necessity of checksum calculation, the head address and data size of the Ethernet® frame stored in the memory 110. The command regarding the necessity of checksum calculation is issued to determine whether a checksum calculation should be performed.

In step S403, the processor interface 301 decodes the command received from the processor 101 and sends the command to the direct memory access task controller 302.

In step S404, the direct memory access task controller 302 acquires an access right to the memory 110 to start the DMA transfer from the arbiter 102 via the arbiter interface 307.

The second direct memory access controller 103 transmits a request signal to the arbiter 102. The arbiter 102 does not reply until the memory 110 is available. The arbiter 102 transmits back a permission signal to the second direct memory access controller 103 when the memory 110 is available. Then, the second direct memory access controller 103 can access the memory 110. When the second direct memory access controller 103 actually accesses the memory 110, it transmits an access signal representing the status of the memory 110 to the arbiter 102. The request signal, the permission signal and the access signal are communicated via the arbitration signal line 113.

In step S405, the direct memory access controller 302 transmits a command to the bus access controller 304. This command is issued to instruct the controller 304 to read information of the network layer of the Ethernet (trademark) frame stored in the memory 110, by a DMA method.

In step S406, the bus access controller 304 transmits the read information of the network layer of the Ethernet (trademark) frame to the communication protocol analyzing unit 305.

In step S407, the communication protocol analyzing unit 305 analyzes the communication protocol based on the information of the network layer of the Ethernet® frame, and transmits the analysis result to the direct memory access task controller 302. For example, when the TCP/IP is employed in the network layer of the Ethernet®, the protocol number is stored in the tenth byte counted from the head address of the IP header. This protocol number is analyzed to identify the communication protocol. The IP header length is stored in the second byte counted from the head address of the IP header. Based on such information, it is possible to determine where to store a checksum in the Ethernet®frame. Besides, the process flow of the second direct memory access controller 103 can be allocated based on the version information of, for example, IPv4/IPv6 (see FIG. 2).

In step S408, the direct memory access task controller 302 determines whether it is necessary to perform checksum calculation when data is transferred from the memory 110 to the communication interface 108. Thus, it is determined whether a checksum calculation result needs to be inserted into the Ethernet® frame. For example, if the processor 101 transmits in advance a command notifying that the checksum calculation is not necessary, to the second direct memory access controller 103 (NO in step S408), the flow proceeds to step S409. Further, if the direct memory access task controller 302 determines that the checksum calculation is not necessary based on the type of communication protocol analyzed in step S407 (NO in step S408), the flow proceeds to step S409. On the contrary, if the direct memory access task controller 302 determines that the checksum calculation is necessary (YES in step S408), the flow proceeds to step S411 of FIG. 6.

In Step S409, the direct memory access task controller 302 transmits a command to start the DMA transfer of the Ethernet® frame from the memory 110 to the external bus 306, to the bus access controller 304. Upon reception of the command, the bus access controller 304 starts the DMA transfer of the Ethernet® frame from the memory 110 to the external bus 306. In this transfer, the bus access controller 304 transfers data to the external bus 306 without storing the data read from the memory 110 into the buffer 105.

In step S410, the direct memory access task controller 302 causes the arbiter interface 307 to output a command to release the memory 110, after the DMA transfer of the Ethernet® frame from the memory 110 to the external bus 306 is completed. Consequently, the access right of the second direct memory access controller 103 to the memory 110 is obtained.

In step S411 of FIG. 6, the direct memory access task controller 302 controls the checksum calculator command outputting unit 303 to output a preset command to the checksum calculator 106. The checksum calculator command outputting unit 303 immediately transmits a preset command to the checksum calculator 106 via the control line 114. This preset command includes mainly information regarding the range of the checksum calculation, however, can include other information as optional information. For example, an initial checksum value before the checksum calculation starts may be set as the optional information.

In step S412, the direct memory access task controller 302 transmits a command to start the DMA transfer of the Ethernet® frame from the memory 110 to the buffer 105, to the bus access controller 304.

In step S413, the direct memory access task controller 302 controls the checksum calculator command outputting unit 303 to output a command to start the checksum calculation. The checksum calculator command outputting unit 303 immediately transmits the command to the checksum calculator 106 via the control line 114. The command to the checksum calculator 106 is given before the bus access controller 304 starts the DMA transfer of the Ethernet® frame from the memory 110 to the buffer 105. Upon reception of the command to start the DMA transfer, the bus access controller 304 starts the DMA transfer, while the checksum calculator 106 performs the checksum calculation for the Ethernet® frame transferred via the memory bus 112. Even when the bus access controller 304 transfers the Ethernet® frame from the memory 110 to the buffer 105, the transferred data remains in the memory 110. This is because the same data is read again at the time of re-transmission.

In Step S414, the direct memory access task controller 302 causes the checksum calculator command outputting unit 303 to output a command to end the checksum calculation after the DMA transfer of the Ethernet® frame from the memory 110 to the buffer 105 is completed. Then, the checksum calculator command outputting unit 303 immediately transmits the command to the checksum calculator 106.

In step S415, the processor 101 determines whether the communication protocol of the Ethernet® frame which is presently handled is for re-transmission. If the communication protocol is not the one for re-transmission (NO in step S415), the flow proceeds to step S416. On the contrary, if the communication protocol is for re-transmission (Yes in step S415), the flow proceeds to step S419.

In step S416, the direct memory access task controller 302 causes the checksum calculator command outputting unit 303 to output a command to output a checksum calculation result. The checksum calculator command outputting unit 303 immediately transmits the command to the checksum calculator 106. At the same time, the direct memory access task controller 302 commands the bus access controller 304 to prepare for writing the checksum calculation result on the buffer 105. The bus access controller 304 secures a predetermined position in the buffer to write the checksum calculation result in a predetermined position of the Ethernet® frame stored in the buffer 105.

In Step S417, the direct memory access task controller 302 controls the bus access controller 304 to write the checksum calculation result in a predetermined position of the Ethernet® frame stored in the buffer 105. This checksum calculation result has been output from the checksum calculator 106 having received the command to output the checksum calculation result, to a data line of the memory bus 112.

In step S418, the direct memory access task controller 302 causes the arbiter interface 307 to output a command to release the memory 110, after writing of the checksum calculation result on the buffer 105 in step S417 is completed. Consequently, the access right of the second direct memory access controller 103 to the memory 110 is obtained.

In step S419, the direct memory access task controller 302 causes the checksum calculator command outputting unit 303 to output a command to output the checksum calculation result. The checksum calculator command outputting unit 303 immediately transmits the command to the checksum calculator 106. At the same time, the direct memory access task controller 302 commands the bus access controller 304 to prepare for writing the checksum calculation result on the buffer 105 and the memory 110. The bus access controller 304 secures a predetermined position in the buffer to store the checksum calculation result in a predetermined position of the Ethernet® frame stored in the buffer 105.

Further, the bus access controller 304 outputs a predetermined address onto an address line of the memory bus 112 to prepare for writing the result into the memory 110 so that the checksum calculation result can be written to a checksum storage address of the source Ethernet® frame in the memory 110.

In step S420, the direct memory access task controller 302 commands the bus access controller 304 to write the checksum calculation result on a predetermined position (checksum storage position) of each Ethernet® frame stored in the buffer 105 and the memory 110. This checksum calculation result has been output from the checksum calculator 106 having received the command to output the checksum calculation result, to the data line of the memory bus 112.

As a result of this process, the Ethernet® frame stored in the memory 110 can be immediately re-transmitted while the second direct memory access controller 103 does not control the checksum calculator 106 to perform the checksum calculation, even if re-transmission of the frame is required after the Ethernet® frame which is presently handled has been sent to a target address. At this time, the Ethernet® frame of the buffer 105 and the source Ethernet® frame of the memory 110 are completed which can be output at any time.

In step S421, the direct memory access task controller 302 causes the arbiter interface 307 to output a command to release the memory 110 after writing of the checksum calculation result on the buffer 105 and the memory 110 in step S420 is completed. Consequently, the access right of the second direct memory access controller 103 to the memory 110 is obtained.

In step S422, the direct memory access task controller 302 commands the bus access controller 304 to output the Ethernet® frame stored in the buffer 105 to the communication interface 108. Upon reception of the command, the bus access controller 304 immediately starts the DMA transfer of the frame from the buffer 105 to the external bus 306.

In step S423, the communication apparatus ends the process.

When the Ethernet® frame is to be re-transmitted, the second direct memory access controller 103 does not control the checksum calculator 106 to perform checksum calculation, but reads the Ethernet® frame to which a checksum calculation result has been added in the procedure of step S420, from the memory 110 and retransmits the read frame.

Figure 7:
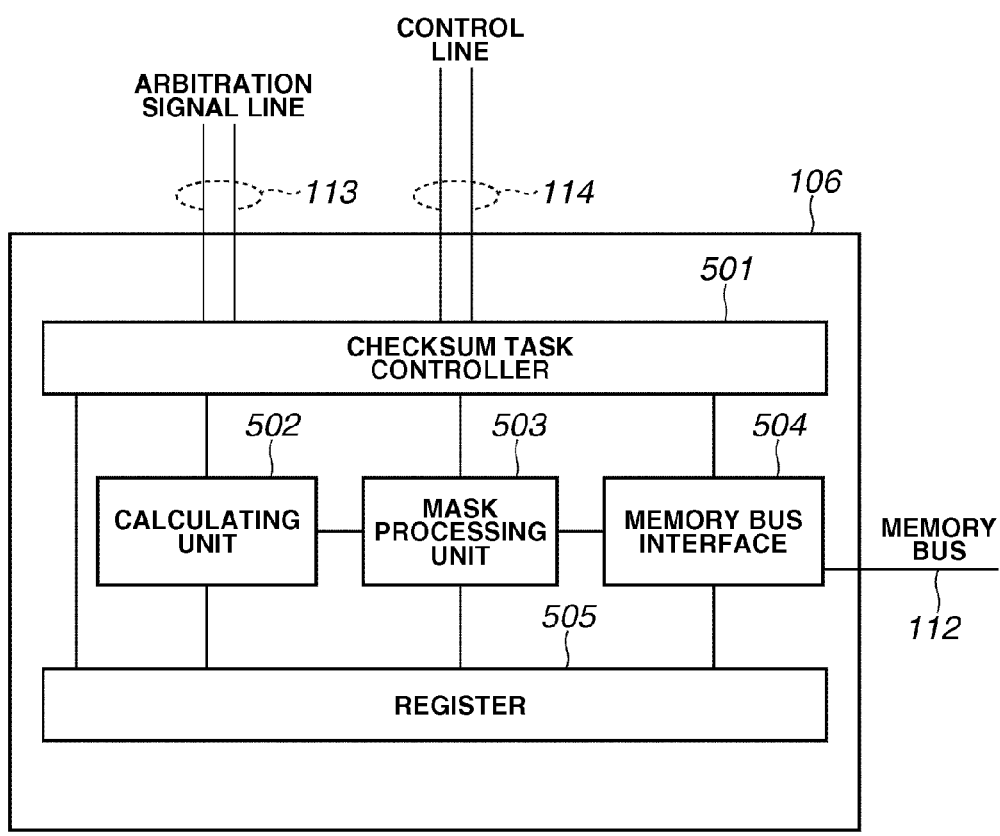
FIG. 7 is a block diagram illustrating a schematic configuration of a checksum calculator.

FIG. 7 is a block diagram illustrating a schematic configuration of the checksum calculator 106 in the communication apparatus of FIG. 1.

In FIG. 7, a checksum task controller 501 controls the task of the entire checksum calculator, in response to a command input from the first direct memory access controller 104 and the second direct memory access controller 103 via the control line 114. That is, upon reception of a checksum starting command from the first and second direct memory access controllers 104 and 103 via the control line 114, the checksum task controller 501 stores a checksum calculation interval specified by this command into a register 505. The checksum task controller 501 transmits a command to start the checksum calculation to a calculation unit 502, a mask processing unit 503 and a memory bus interface 504.

Upon reception of a command to complete the checksum calculation from the direction memory access controller via the control line 114, the checksum task controller 501 instructs the calculation unit 502, the mask processing unit 503 and the memory bus interface 504 to end the checksum calculation.

Upon reception of a command to output a checksum calculation result from the first and second direct memory access controllers 104 and 103 via the control line 114, the checksum task controller 501 instructs the memory bus interface 504 to read the calculation result stored in the register 505 and to output the read result to the data line of the memory bus 112.

In response to a command from the checksum task controller 501, the calculation unit 502 performs addition or bit flipping for the input data from the mask processing unit 503 so as to perform the checksum calculation. In response to a command from the checksum task controller 501, the calculation unit 502 stores the checksum calculation result into the register 505.

In response to a command from the checksum task controller 501, the mask processing unit 503 reads the checksum calculation interval stored in the register 505, and performs a mask process for the input data from the memory bus interface 504 other than the checksum calculation interval.

In response to a command from the checksum task controller 501, the memory bus interface 504 identifies and reads (snoops) necessary data to be transferred to the data line of the memory bus 112, based on the checksum calculation interval stored in the register 505 and a value of the address line of the memory bus 112. Then, the interface 504 inputs the read data to the mask processing unit 503. In addition, in response to a command from the checksum task controller 501, the memory bus interface 504 reads the checksum calculation result obtained by the calculation unit 502 and outputs the result from the register 505 to the data line of the memory bus 112.

The register 505 stores the checksum calculation intervals, middle numbers required in the process of the checksum calculations and checksum calculation results of the first and second direct memory access controllers 104 and 103. The checksum calculator 106 includes one or more registers corresponding to the number of the connected direct memory access controllers.

FIG. 8 is a timing chart illustrating the timing when target data for checksum calculation is acquired in the checksum calculator 106 of FIG. 7.

A signal 601 is a clock signal of the processor 101. A signal 602 is an access signal which is input from the first direct memory access controller 104, and which indicates the access state of the first direct memory access controller 104 to the memory 110. A signal 603 is an access signal which is input from the second direct memory access controller 103, and which indicates the access state of the second direct memory access controller 103 to the memory 110.

A signal 604 represents a value of the address line of the memory bus 112. A signal 605 represents a value of the data line of the memory bus 112. A signal 606 represents a value of 32-bit data read by the memory bus interface 504 from the data line of the memory bus 112.

A signal 607 represents a value of 32-bit mask data which has been obtained by the mask processing unit 503 performing mask processing for the 32-bit read data. A signal 608 represents unit processing data which has been divided at the time of transmitting the 32-bit mask data to the calculation unit 502.

In FIG. 8, in the processor 101, the data line of the memory 110 handles 32-bit data, while the calculation unit 502 handles 8-bit data as unit processing data. However, the values can be changed depending on the specifications of the used memory or the specifications of the checksum calculation processing system. To perform the checksum calculation at the time of multiple DMA transfers, a signal representing an access state of the direct memory access controllers to the memory 110 that is input from the direct memory access controllers 103 and 104 to the memory 100, is also input to the checksum calculator 106. Based on this signal, a determination is made as to which direct memory access controller handles the 32-bit read data acquired from the data line of the memory 110.

Upon reception of a start command from an arbitrary direct memory access controller, the checksum task controller 501 determines which direct memory access controller handles the 32-bit read data acquired from the data line of the memory 110 based on signals (signals 602 and 603 in FIG. 8) input from its direct memory access controller and representing the access state of the direct memory access controller to the memory 110.

After that, the 32-bit read data is masked to be 32-bit mask data as needed based on the target interval for checksum calculation which has been set in advance by each direct memory access controller. Then, the 32-bit mask data is divided into four, and the resultant data is sent as 8-bit processing unit data to the calculation unit 502 to obtain the sum value.

Upon reception of a command to complete the checksum calculation from each direct memory access controller, the checksum calculator 106 performs the checksum calculation based on the checksum value and stores the data into the register 505. Then, upon reception of a command to output the checksum calculation result from each direct memory access controller, the checksum calculator 106 outputs the checksum calculation result stored in the register 505 to the data line of the memory bus 112.

According to the embodiment, there is no need to perform a conventional process, in which the processor at first gives a command to perform the checksum calculation to the hardware, in response to the command, the processor inserts a checksum calculation result into a predetermined address of the communication frame and gives a command to transmit the communication frame to the hardware again. In addition, for each communication frame, there is also no need to give a different command each time to the hardware according to the type of the communication protocol so that the processing burden on the processor can be reduced.

When a request for re-transmission of the communication frame is sent from the processor to the hardware, it is not necessary to perform the checksum calculation again. Thus, the communication frame can be immediately transmitted by the direct memory access transfer.

Accordingly, rapid throughput in the data transfer can be realized.

The present invention can be achieved by providing a system or apparatus with a storage medium which stores program codes of software realizing the functions of the embodiment. In this case, a computer (or CPU, MAP, etc.) On the system or apparatus reads and executes the program codes stored on the storage medium. The program codes read from the storage medium realize the functions of the embodiment. Thus, the program codes and the storage medium storing the program codes are included in the present invention.

The storage medium for providing the program codes may include, for example, a floppy disk, a hard disk, and a magneto-optical disk, a compact disk-read only memory (CD-ROM), a CD-recordable (CD-R), a CD-rewritable (CD-RW), a digital versatile read only memory (DVD-ROM), a DVD-recordable (DVD±R), a DVD random access memory (DVD-RAM), a DVD-rewritable (DVD±RW), an optical disk, a magnetic tape, a non-volatile memory card, a ROM, etc. The program codes can be downloaded via a network.

The functions of the embodiment are realized by executing the program codes read by the computer. Moreover, the functions of the embodiment can be realized as a result of an actual process that is partially or entirely executed by an operating system (OS) running on a computer, based on instructions of the program codes.

Further, the program codes read from the storage medium are written into a memory included in an extension board inserted into a computer or in an extension unit connected to a computer. In response to a command of the program codes, the actual process is executed partially or entirely by the CPU, etc. included in the extension board or extension unit. Thus, the functions of the embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-291420 filed Oct. 26, 2006, which is hereby incorporated by reference herein in its entirety.

What is claimed is:

1. An apparatus which is capable of transmitting data, the apparatus comprising:
a memory in which the data is stored;
a communication interface configured to transmit the data stored in the memory to an external destination;
a determination unit configured to determine a communication protocol used for transmitting the data to the external destination;
a first storage control unit configured to control conversion of the data stored in the memory into communication frames which are also stored in the memory;
a first transferring unit configured to transfer a first communication frame from the memory to a buffer; and
a calculator configured to perform a checksum calculation on the first communication frame being transferred from the memory to the buffer;
a second storage control unit configured to:
add a result of the checksum calculation performed by the calculator to the first communication frame stored in the buffer and to the first communication frame stored in the memory, in a case where the communication protocol determined by the determination unit is a communication protocol that requires retransmission, and
add the result of the checksum calculation to the first communication frame stored only in the buffer, in a case where the communication protocol determined by the determination unit is a communication protocol that does not require retransmission,
a second transferring unit configured to:
transfer the first communication frame to which the result of the checksum calculation is added in the buffer from the buffer to the communication interface, in a case where the first communication frame is transmitted for a first time by the communication protocol that requires retransmission, and
transfer the first communication frame to which the result of the checksum calculation is added in the memory directly from the memory to the communication interface without performing the checksum calculation on the first communication frame, in a case where the first communication frame is retransmitted by the communication protocol that requires retransmission,
wherein the determination unit analyzes a network layer of the data and determines the communication protocol,
wherein the determination unit determines whether the communication protocol for transmitting the data is a communication protocol that requires retransmission,
wherein the determination unit is further configured to determine whether or not the checksum calculation should be performed based on the communication protocol determined by the determination unit, and
wherein the checksum calculation by the calculator and the processing by the second storage control unit are performed according to the communication protocol determined by the determination unit.

2. The apparatus according to claim 1, further comprising:
a controller which includes the second storage control unit, the first transferring unit, the second transferring unit and the buffer,
wherein the controller transfers the first communication frame from the memory to the buffer and from the buffer to the communication interface under direct memory access control, and wherein the controller transfers the first communication frame from the memory to the communication interface under direct memory access control.

3. The apparatus according to claim 1, wherein the apparatus is a communication apparatus.

4. The apparatus according to claim 1, wherein the second storage control unit adds the result of the checksum calculation to the first communication frame by inserting the calculation result at a predetermined position of the first communication frame.

5. A method for transmitting data stored in a memory of a communication apparatus to an external destination, the method comprising:
- a determination step of determining a communication protocol for transmitting the data;
- a conversion step of converting the data stored in the memory into communication frames also stored in the memory;
- a first transfer step of transferring a first communication frame from the memory to a buffer;
- a calculation step of performing checksum calculation on the first communication frame being transferred from the memory to the buffer; and
- a storage control step of adding a result of the checksum calculation performed by the calculation step to the first communication frame stored in the buffer and to the first communication frame stored in the memory in a case where the communication protocol determined by the determination step is a communication protocol that requires retransmission, and
adding the result of the checksum calculation to the first communication frame stored only in the buffer, in a case where the communication protocol determined by the determination step is a communication protocol that does not require retransmission;
- a second transfer step of transferring the first communication frame to which the result of the checksum calculation is added in the buffer memory from the buffer memory to the interface, in a case where the first communication frame is transmitted for a first time by the communication protocol that requires retransmission, and
- to transfer the first communication frame to which the result of the checksum calculation is added in the memory from the memory to the interface directly without adding the result of the checksum calculation to the first communication frame in the buffer, in a case where the first communication frame is retransmitted by the communication protocol that requires retransmission,
wherein the determination step comprises analyzing a network layer of the data and determining the communication protocol,
wherein the determination step comprises determining whether the communication protocol for transmitting the data is a communication protocol that requires retransmission,
wherein the determination step comprises determining whether or not the checksum calculation should be performed based on the communication protocol determined, and
wherein the checksum calculation and the storage control step are performed according to the communication protocol determined

* * * * *